United States Patent [19]
Caulfield et al.

[11] Patent Number: 5,465,311
[45] Date of Patent: * Nov. 7, 1995

[54] SIDE ILLUMINATED MULTIMODE WAVEGUIDE

[75] Inventors: H. John Caulfield; Qiang Huang, both of Huntsville, Ala.; Andrei Putilin, Moscow, Russian Federation; Valentin Morozov, Boulder, Colo.

[73] Assignee: The University of Alabama in Huntsville, Huntsville, Ala.

[ * ] Notice: The portion of the term of this patent subsequent to Mar. 15, 2011, has been disclaimed.

[21] Appl. No.: 179,209

[22] Filed: Jan. 10, 1994

Related U.S. Application Data

[62] Division of Ser. No. 841,576, Feb. 26, 1992, Pat. No. 5,295,208.

[51] Int. Cl.$^6$ ........................................ G02B 6/34
[52] U.S. Cl. ........................ 385/27; 385/37; 359/34
[58] Field of Search .................. 385/36, 37, 41, 385/42, 27, 129; 359/34

[56] References Cited

U.S. PATENT DOCUMENTS

| | | | |
|---|---|---|---|
| 3,584,230 | 6/1971 | Tien | 385/36 X |
| 3,810,688 | 5/1974 | Ballman et al. | 385/129 X |
| 3,883,221 | 5/1975 | Rigrod | 385/36 |
| 4,400,616 | 8/1983 | Chevillat et al. | 359/34 X |
| 4,807,950 | 2/1989 | Glenn et al. | 350/3.61 |
| 4,997,244 | 3/1991 | Nishio et al. | 385/27 |
| 5,268,985 | 12/1993 | Ando et al. | 359/34 |
| 5,295,208 | 3/1994 | Caulfield et al. | 385/27 |

Primary Examiner—John D. Lee
Assistant Examiner—Phan T. H. Palmer
Attorney, Agent, or Firm—Oblon, Spivak, McClelland, Maier & Neustadt

[57] ABSTRACT

A multimode waveguide having a small thickness has light coupled to the side of the waveguide in order to provide a multimode operation of the waveguide for providing a continuous pattern of totally internally reflected light which is utilized to reconstruct holographic images from a holographic emulsion placed on a surface of the waveguide. This waveguide structure for reconstructuring a hologram has the capability of providing highly efficient hologram reconstruction while using ordinary light sources and is able to use beam diameters greater than the thickness of the waveguide.

14 Claims, 2 Drawing Sheets

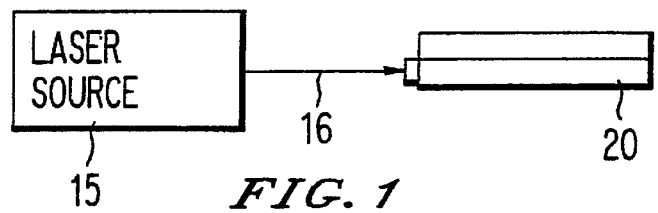
FIG. 1
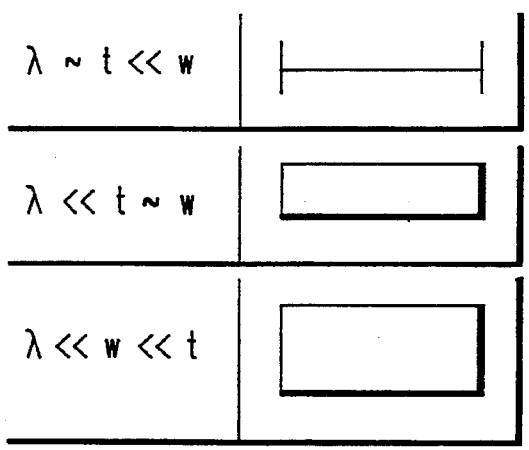
FIG. 2a
FIG. 2b
FIG. 2c
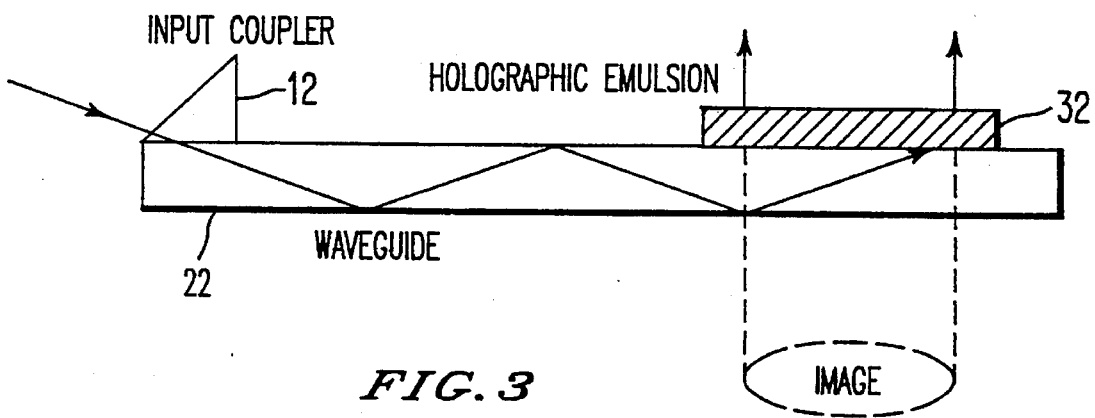
FIG. 3

SIDE ILLUMINATED MULTIMODE WAVEGUIDE

This is a division of application Ser. No. 07/841,576 filed on Feb. 26, 1992, now U.S. Pat. No. 5,295,208.

BACKGROUND OF THE INVENTION

1. Field of the Invention

The present invention is addressed to improved waveguide holograms and particularly multimode waveguides having superior input light coupling.

2. Discussion of the Background

Waveguide holography offers many advantages when compared to conventional holograms. Waveguide holograms provide for the recording and reconstructing of holographic images with lightwaves which propagate along optical waveguides. When this is contrasted with conventional holograms, a higher image-to-background contrast is obtained and a higher global diffraction efficiency is obtained with low diffraction efficiency materials. Furthermore, waveguide holograms provide minimized illumination space and obstruction free viewing.

A waveguide hologram is strictly defined as a hologram whose image wavefront is reconstructed with a guided light from the waveguide. Thus, a waveguide hologram (WGH) consists of an input coupler 10, the waveguide itself 20 and the holographic emulsion 30 as shown in FIG. 1. A source of light 15 is coupled into the waveguide and this waveguide is normally a sheet of transparent material with two surfaces which are locally parallel and optically polished. The refractive index of a waveguide must be higher than the index of the environment in order to achieve the principles of waveguide transportation.

The different types of waveguides are distinguished by the size of the dielectric which constitutes the waveguide and by the mode of illumination. Prior art devices in the waveguide hologram field utilize edge illumination in a single mode waveguide or in a multimode waveguide. Single mode waveguides are used to couple integrated circuits with optics in interconnected electronic packages. These single mode waveguides are very clean, however, they require an extremely precise orientation of the input light source. That is, these type of WGHs are very thin and the light must be coupled at the edge very carefully to provide proper alignment.

Another type of waveguide is a multimode waveguide which involves internal reflections.

The prior art edge lit multimode waveguides suffer from problems with coupling efficiencies and a requirement for input light direction. Furthermore, the matching of the size of the input light i.e. the diameter, is an important factor in these edge lit multimode waveguides as they are in the edge lit single mode waveguides. The categories of waveguide based upon the width (w) of an incident beam of light, the optical waveguide thickness (t) and the wavelength of the incident light wave ($\lambda$) are shown in FIG. 2a–c.

A first category of thin film waveguide as shown in FIG. 2a has $\lambda \sim t \ll w$. This is a thin guided layer coated on a glass substrate of the type used in integrated optics. The major drawback to this type of structure of course is that it is difficult to achieve high coupling efficiency and white light coupling is impossible.

A second category, as shown in FIG. 2b, has a thick substrate waveguide wherein $\lambda \ll t \sim w$. Although light coupling in the edge is easy, such light coupling creates multiple discrete "bounces" at the waveguide surfaces and as a result, edge lighting can only provide discrete holograms.

In the third category of FIG. 2c there is a dielectric block wherein $t \gg w \gg \lambda$. This type of structure allows white light to be edge-introduced and illuminates a hologram with no bounce, however, it is much too bulky to be used and to be of interest in the field of waveguide holograms.

These types of edge lit multimode waveguides have the above associated disadvantages and it is the purpose of the present invention to provide an improved waveguide structure which eliminates these disadvantages and provides ease of construction.

SUMMARY OF THE INVENTION

It is an object of the present invention to provide an improved construction for a waveguide hologram which is able to have increased coupling efficiency, total internal reflection and the ability to use a wide variety of non-critical light sources. There is also an object of the present invention to form a spatially continuous pattern of totally internally reflected light in a multimode waveguide with a normal unmodified light source.

These and other objects of the present invention are obtained by a waveguide construction in a waveguide environment capable of supporting multimode operation and in which the light source enters the side of the waveguide instead of the edge of the waveguide.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a prior art edge lit wave guide hologram structure;

FIG. 2a–c shows various types of waveguide based upon the thickness of the dielectric material;

FIG. 3 details a multimode side illuminated waveguide hologram according to the present invention;

DESCRIPTION OF THE PREFERRED EMBODIMENTS

Figure 4:
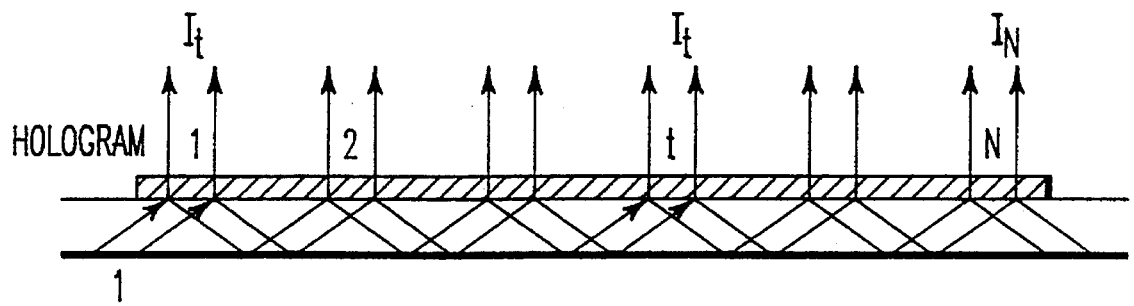
FIG. 4 illustrates multiple utilization of the illuminated beam of the waveguide hologram of FIG. 3.

Referring now to the drawings, wherein like reference numerals designate identical or corresponding parts throughout the several views, and more particularly to FIG. 3 thereof, there is described the embodiment which meets the objects of the present invention and which provides a side illuminated waveguide hologram.

The light source for the hologram of the FIG. 3 is attained by way of an input coupler mechanism 12 which conducts light from a source into the waveguide. This input coupler can be a prism or a grating or an optical fiber. The waveguide itself 22 is a sheet of transparent material with two surfaces which are locally parallel and optically polished. The refractive index of the waveguide must be higher than the index of the environment in order to achieve waveguiding. The wave which is coupled in is confined in the waveguide by total internal reflection on the waveguide surfaces and propagates along a zigzag path as illustrated. The holograph emulsion 32 is placed parallel to and immediately in contact with the waveguide. This holographic recording material can be a silver halide emulsion, a photopolymer layer, a dicromated gelatin film or a photoresist coating. When the hologram is illuminated with the guided wave, the previously recorded holographic image is reconstructed.

When compared with conventional holography, the waveguide holograms provide a compact system without requiring the kind of alignment required for conventional holography. Because of the flexibility of the optical fiber, the laser or incoherent source which is used can be remotely located. The waveguide hologram system is flat and it can be hung on a wall or hand held without concern as to its illumination. Furthermore, the reconstructed image in a waveguide hologram is obstruction free and because the illumination beam is confined in the waveguide it cannot be blocked. Because of the high image to background contrast and multiple utilization of the illumination beam as shown in the FIG. 4, a bright image can be obtained. Furthermore because the image can only be reconstructured by the light inside the waveguide other light sources will not affect the quality of the image.

The utilization of a multimode waveguide is illustrated in FIG. 3. Using side illumination provides for improved coupling efficiency over edge illuminated waveguides and further allows for use of an easily directed light source without requiring modification of the light source. With the type of system shown in FIG. 3, although a laser could be utilized, either white light or other sources of light having a wide beam can be used. It is to be noted that in edge lit illumination systems, there is a restriction on the width of the input light beam. That is, the input light beam can be no larger than the thickness of the wave guide.

The side illuminated multimode waveguide is particular advantageous in conjunction with waveguides which have a thickness greater than the wavelength but yet the thickness can be less than the width of an incident light beam i.e. $\lambda<<t<w$. Because the thickness is much greater than the wavelength, the difficulties of thin film waveguides are overcome and white light illumination can be conveniently used. Furthermore, because the thickness is less than the width of the beam, uniform illumination is obtained. These advantages are brought out by the side illumination input light coupling of FIG. 3 and provide for a significant ease of construction and a compact package. The utilization of a waveguide with the thickness much greater than the wavelength but less than the width of the input beam allows for use of a side input coupled light source with a relatively wide beam width in order to form a spatially continuous pattern of totally internally reflected light. This multimode side input coupled waveguide hologram provides for a multiple utilization of the illumination beam as shown in FIG. 4 and functions to provide an undiffracted beam, confined in the waveguide, to reconstruct the holographic image as shown in FIG. 5.

Figure 5:
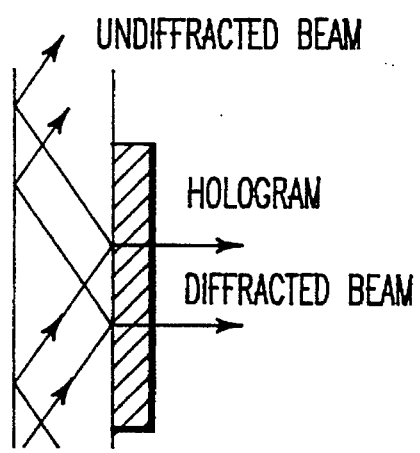
FIG. 5 details the reconstruction of the recorded holographic image in the system of FIG. 3.

The FIG. 4 illustrates the illumination process wherein the collimated guided illumination beam, when it reaches an area where the hologram is placed, first encounters the region 1 of the hologram. A part of the light is diffracted as the reconstruction of the image and the rest of the light is reflected. After total internal reflection at the other waveguide surface, the residual light illuminates the region 2 on the hologram and undergoes the second reconstruction. This process is repeated until the illumination beam passes the hologram. Because of the multiple utilization of the illumination beam, the holographic image constructed by the FIG. 3 embodiment is more efficient than in conventional holography. The portions of the beam that are undiffracted remain confined in the waveguide and therefore the undiffracted light makes no contribution to the background brightness. Thus, a bright image can be obtained even with an inefficient hologram by simply increasing the power of the illumination beam. This increased power will increase the brightness of the image with no contribution to the background brightness because, as indicated above, the undiffracted light confined within the waveguide makes no contribution to the background brightness.

A significant factor in the improvement of performance and simplicity of construction is the use of the side input coupled light in contrast to edge lit structures. The edge lit waveguide structures require either a laser beam or a thick wave guide in order to function properly. With the present structure using a side light input coupling, full internal reflection is obtained with ordinary light sources, including fiber optic input which allows for remote non-critical location of the actual light source.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A waveguide hologram for illumination with a light beam having at least one spectral component with a wavelength $\lambda$, said waveguide hologram comprising:

a waveguide for supporting multimode propagation of light, and having first and second main surfaces defining a thickness dimension disposed therebetween, a widthwise extent having opposing ends, a lengthwise extent having opposing ends, and first and second edge surfaces disposed at the opposing ends of said lengthwise extent;

input coupling means, disposed at one of said first and second main surfaces in the vicinity of said first edge surface, for coupling said light beam into said waveguide so that said coupled light beam provides a spatially continuous pattern of light within said waveguide and the rays of said spatially continuous pattern of light are totally internally reflected therewithin, and the thickness dimension of said waveguide being greater than the wavelength $\lambda$ of said at least one spectral component of said light beam coupled into said waveguide; and a recording medium disposed on one of said first and second main surfaces and containing a recorded hologram consisting of an interference pattern.

2. The waveguide hologram according to claim 1, which further comprises light beam producing means for producing said light beam.

3. The waveguide hologram according to claim 2, wherein said light beam producing means comprises a source of coherent light.

4. The waveguide hologram according to claim 2, wherein said light beam producing means comprises a source of non-coherent light.

5. The waveguide hologram according to claim 3, wherein said light beam producing means comprises laser.

6. The waveguide hologram according to claim 1, wherein said input coupling means is a grating or a prism.

7. The waveguide hologram according to claim 1, which further comprises a light beam producing means for producing a point source of light which is coupled to one of said first and second main surfaces by way of said input coupling means.

8. The waveguide hologram according to claim 6, which further comprises light beam producing means for producing a white light beam that is coupled to said first or second main surfaces.

9. The wavelength hologram according to claim 1, wherein said continuous pattern of light interacts with said recording medium in such a way that a portion of said light beam is diffracted, while the remainder of the light beam is reflected from said first or second main surface supporting said recording medium.

10. The waveguide hologram according to claim 1, wherein the thickness dimension of said waveguide is less than the width of said light beam coupled to one of said first and second main side surfaces.

11. The waveguide hologram according to claim 1, wherein said input coupling means comprises one or more optical fibers.

12. The waveguide hologram according to claim 1, wherein said waveguide comprises an optically transparent sheet.

13. The waveguide hologram according to claim 1, wherein said first and second main surfaces are substantially parallel.

14. The waveguide hologram according to claim 1, wherein said interference pattern contains information of 3-D object.

* * * * *

UNITED STATES PATENT AND TRADEMARK OFFICE
CERTIFICATE OF CORRECTION

PATENT NO. : 5,465,311
DATED : November 7, 1995
INVENTOR(S) : H. John CAULFIELD, et al.

It is certified that error appears in the above-indentified patent and that said Letters Patent is hereby corrected as shown below:

Column 1, after the title and before the specification, please insert the following paragraph --This invention was made with Government support under Contract F30602-88-D-0025 awarded by Rome Air Development Center, Department of the Air Force. The Government has certain rights in this invention.--

Signed and Sealed this

Twenty-eighth Day of May, 1996

Attest:

BRUCE LEHMAN

*Attesting Officer*   *Commissioner of Patents and Trademarks*